United States Patent [19]
Tackett, Sr.

[11] Patent Number: 5,775,385
[45] Date of Patent: Jul. 7, 1998

[54] PROCESS AND SYSTEM FOR CHANGING OIL

[76] Inventor: Charles R. Tackett, Sr., 524 Woodbine St., Willard, Ohio 44890

[21] Appl. No.: 673,416

[22] Filed: Apr. 15, 1996

Related U.S. Application Data

[63] Continuation-in-part of Ser. No. 36,102, Apr. 27, 1995, abandoned.

[51] Int. Cl.⁶ ............................................. F01M 11/04
[52] U.S. Cl. ...................... 141/98; 141/332; 141/340; 141/343; 141/384; 184/1.5; 184/106
[58] Field of Search ................. 141/331–333, 141/337, 338, 340–343, 384, 98; 184/1.5, 106

[56] References Cited

U.S. PATENT DOCUMENTS

| | | | |
|---|---|---|---|
| 4,098,398 | 7/1978 | Meyers | 141/340 |
| 4,269,237 | 5/1981 | Berger | 184/1.5 |
| 4,697,670 | 10/1987 | Arruda | 184/1.5 |
| 4,756,411 | 7/1988 | Garland | 141/98 |
| 4,823,947 | 4/1989 | Maynard, Jr. | 141/98 |
| 5,048,578 | 9/1991 | Dorf et al. | 184/1.5 |
| 5,188,156 | 2/1993 | Littlepage | 141/98 |
| 5,467,746 | 11/1995 | Waelput et al. | 184/1.5 |
| 5,562,181 | 10/1996 | Elkin et al. | 184/1.5 |

*Primary Examiner*—J. Casimer Jacyna
*Attorney, Agent, or Firm*—Jerry Semer

[57] ABSTRACT

The invention is a method for changing oil that is much quicker, easier, and cleaner. To use the method one changes his oil in the regular way however he replaces the plug in the oil pan of the engine with a plug that has a quick disconnect valve on it. Then the next time one wishes to change oil he uses a container with a used oil tube connected to it. At the end of the used oil tube opposite the end connected to the closed container a quick disconnect is attached to the tube and said quick disconnect is adapted to fit the quick disconnect of the plug in the bottom of the oil pan. Thus, to remove oil from the motor vehicle one only has to connect the tube on the container to the tube in the plug at the bottom of the oil pan. In the preferred embodiment the plug in the bottom of the oil pan has a tube that runs out of it to the edge of the motor vehicle and this tube has a quick disconnect attached to the end opposite the end of the tube attached to the plug. Thus the individual can attached the used oil tube to the plug tube and drain the oil from the automobile without having to get underneath the automobile. To add oil to the automobile, a container filled with the 4 or more quarts of oil, the necessary amount for the vehicle is used. This container has an oil filler tube running out of its side near the bottom and said oil filter tube is placed in the opening in the automobile to add oil and the oil is allowed to run out of the container into the vehicle. Then the oil filter is removed and placed in a compartment of the container for the used oil. Thus the used oil and oil filter is contained in one container. In another embodiment of the invention the invention is basically a package that contains an oil filter and a compartment for oil in one package.

4 Claims, 5 Drawing Sheets

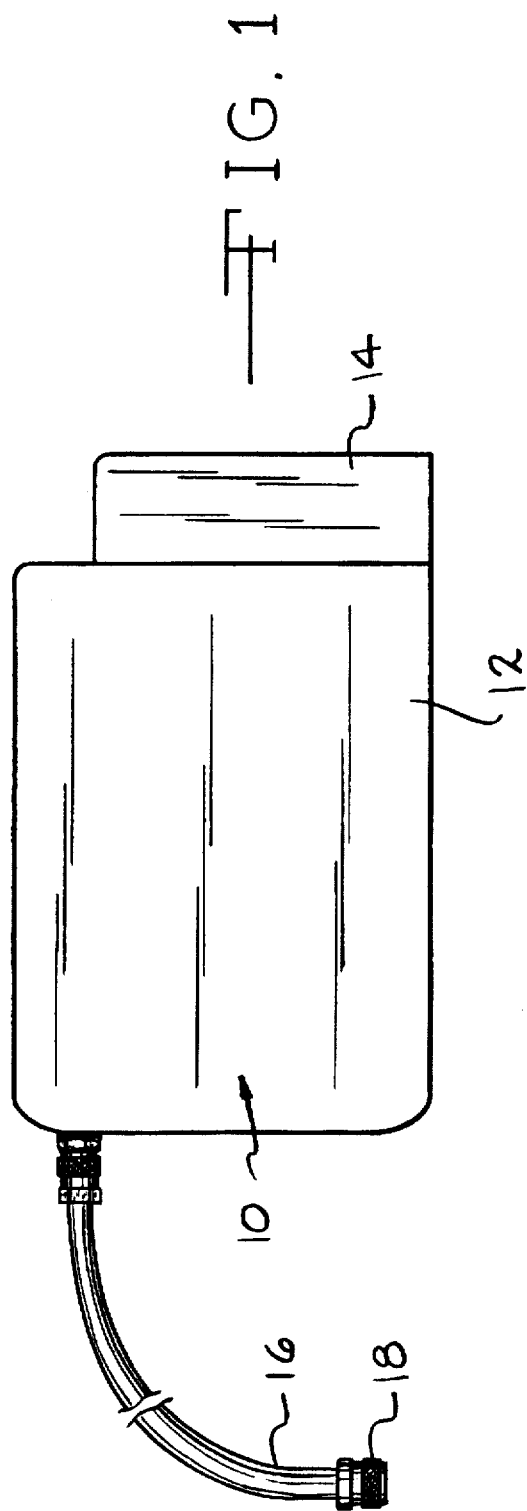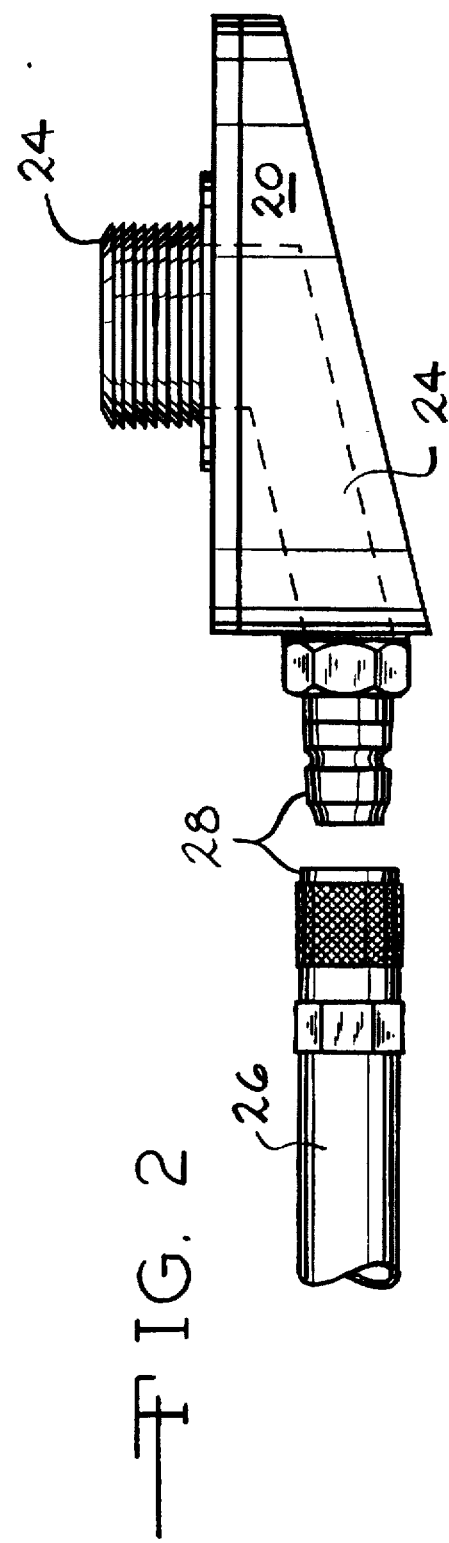

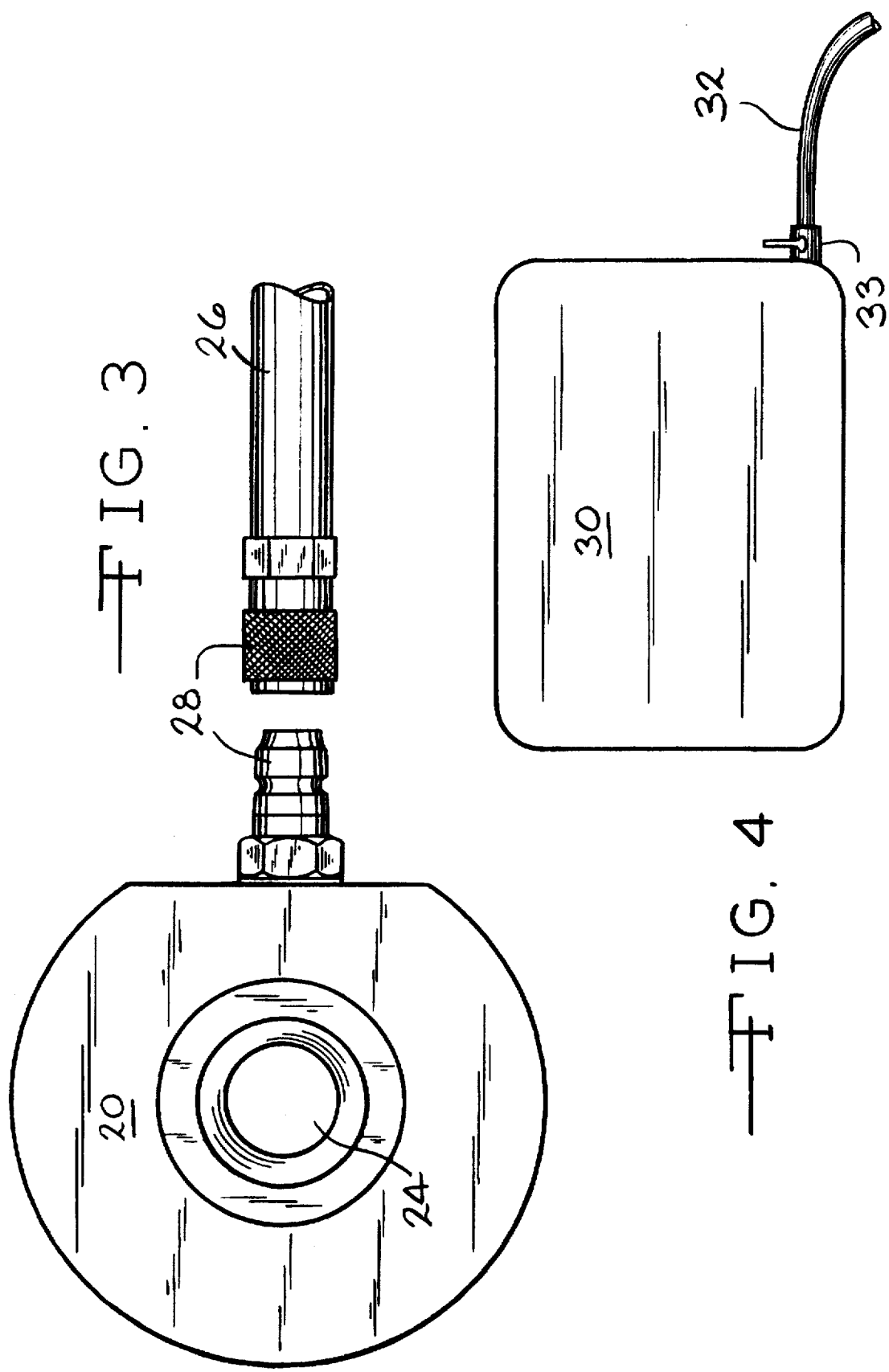

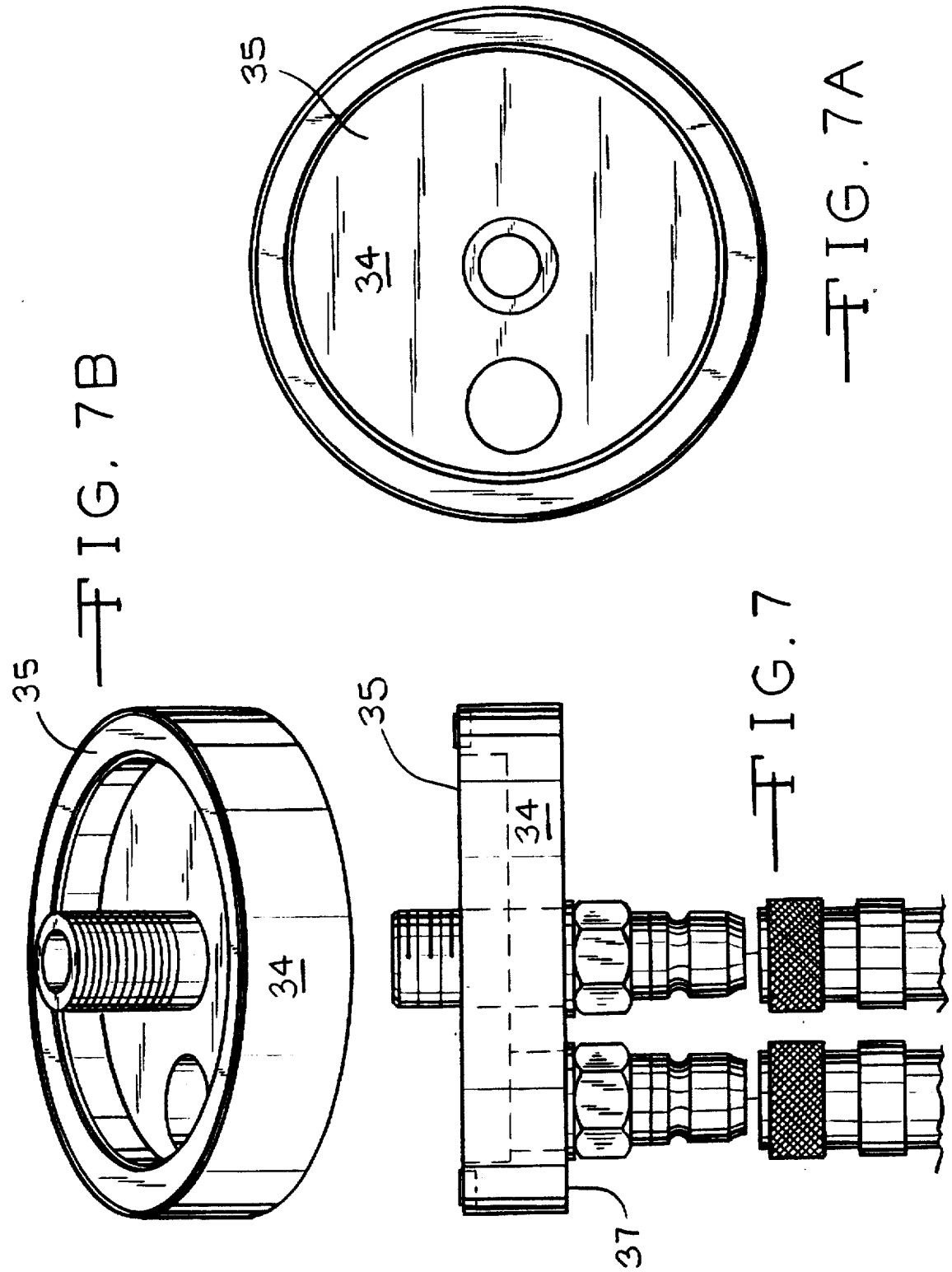

PROCESS AND SYSTEM FOR CHANGING OIL

This application is a continuation-in-part of application Ser. No. 29/036.102 filing date Apr. 27, 1995, now abandoned.

FIELD OF THE INVENTION

This invention relates to a process and system for changing oil in a motor vehicle.

BACKGROUND OF THE INVENTION

One of the problems today with changing oil is what to do with the used oil. When one changes the oil on his automobile one usually pulls the plug in the bottom of the automobile and allows the oil to run out in a pan or pail. There are two majors problems created by this system. The first problem is that one has to get under the automobile and screw out the plug which is a reasonably difficult and dirty operation. Thus, one of the objectives of this invention is to create a system for oil changes in which one will not have to jack up a car to get under it to remove the oil. The second problem is what you do with the used oil. Thus, one of the objectives of this invention is to create a container for used oil so that it may be easily eliminated. Another objective of the invention is to create a system that there is no necessity to crawl under the auto. The feature that enables this inventions to obtain the objective is that the old oil and old oil filter is stored in one package. This system will be easy and inexpensive to manufacture and use. Further it will make the changing of oil a much easier and cleaner task.

SUMMARY OF THE INVENTION

The invention is a method for changing oil that is much quicker, easier, and cleaner. To use the method one changes his oil in the regular way however he replaces the plug in the oil pan of the engine with a plug that has a quick disconnect valve on it. Then the next time one wishes to change oil he uses a container with a used oil tube connected to it. At the end of the used oil tube opposite the end connected to the closed container a quick disconnect is attached to the tube and said quick disconnect is adapted to fit the quick disconnect of the plug in the bottom of the oil pan. Thus, to remove oil from the motor vehicle one only has to connect the tube on the container to the tube in the plug at the bottom of the oil pan. In the preferred embodiment the plug in the bottom of the oil pan has a tube that runs out of it to the edge of the motor vehicle and this tube has a quick disconnector attached to the end opposite the end of the tube attached to the plug. Thus the individual can attached the used oil tube to the plug tube and drain the oil from the automobile without having to get underneath the automobile. To add oil to the automobile, a container filled with the 4 or more quarts of oil, the necessary amount for the vehicle is used. This container has an oil filler tube running out of its side near the bottom and said oil filter tube is placed in the opening in the automobile to add oil and the oil is allowed to run out of the container into the vehicle. Then the oil filter is removed and placed in a compartment of the container for the used oil. Thus the used oil and oil filter is contained in one container. In another embodiment of the invention the invention is basically a package that contains an oil filter and a compartment for oil in one package.

BRIEF DESCRIPTION OF THE DRAWINGS

FIG. 1 shows the used oil and filter container.

FIG. 2 is a side view of the plug of the invention.

FIG. 3 is a top view of the plug of this invention.

FIG. 4 is the oil container of this invention.

FIG. 7 is a side view of the adapter.

FIG. 7a is a bottom view of the adapter.

FIG. 7b is a perspective view of the adapter.

DETAILED DESCRIPTION OF PREFERRED EMBODIMENT

Figure 5:
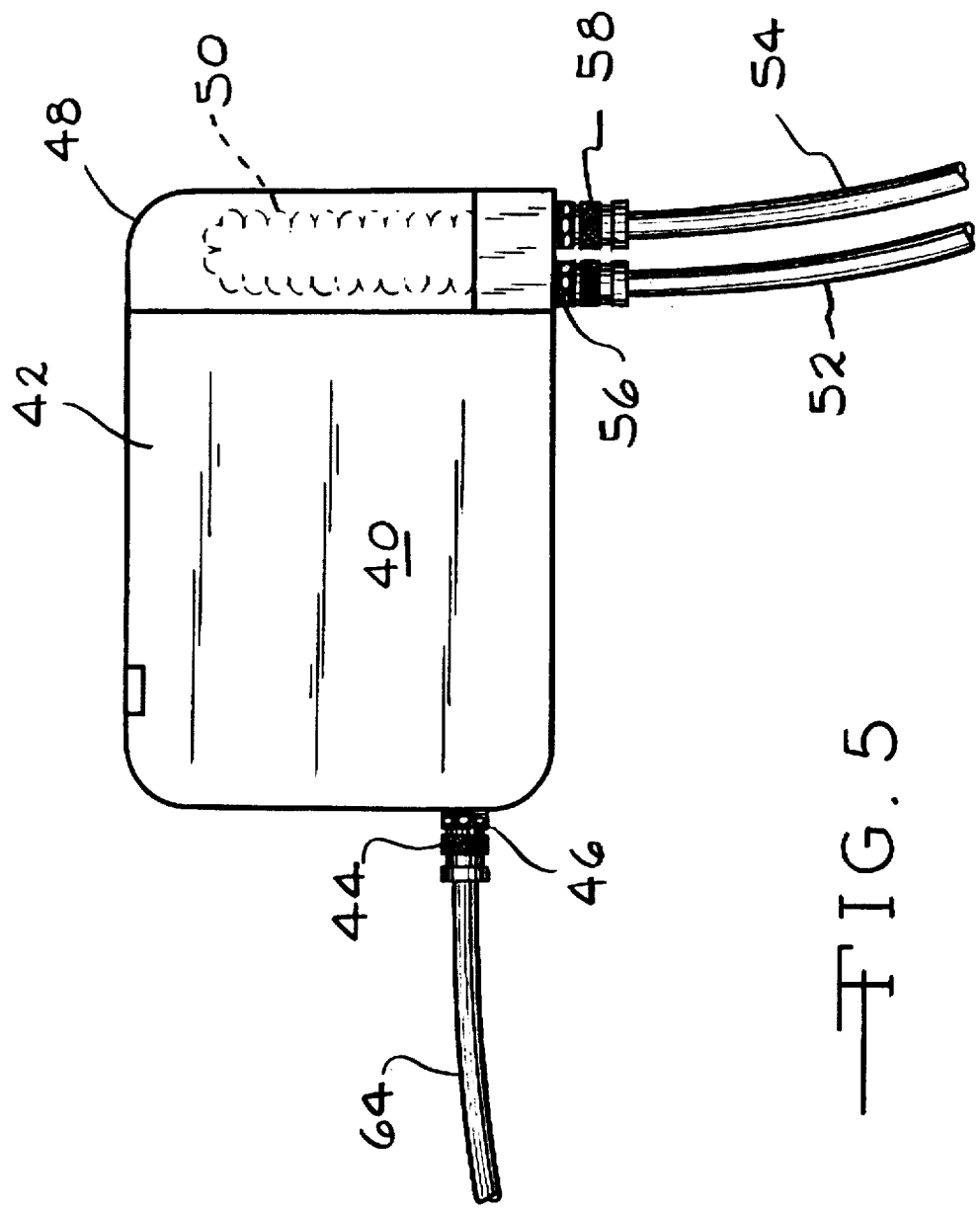
FIG. 5 is a view of the oil and filter combination pack.

FIG. 1 shows the used oil and filter container. FIG. 1 shows a container 10 with two compartments 12 and 14. Old oil compartment 12 is closed but attached to old oil compartment 12 is the old oil tube 16. The old oil tube 16 is attached to the old oil compartment 12 at the top of the old oil compartment. The old oil tube 16 has on the end opposite the end attached to the old oil compartment a quick disconnector 18. The old oil compartment 12 is of sufficient size to hold all the used oil from an automobile, truck or other vehicle. The old oil filter compartment is open and of a size sufficient to allow the old oil filter to be placed within. In the preferred embodiment the container is made out of plastic to make it lightweight. However any other type of materials for making it a container could be used. In the preferred embodiment the old oil compartment is collapsible. When the old oil compartment 12 is hooked by the old oil tube 16 to the oil pan of the automobile the old oil compartment 12 is collapsed so that as the oil runs into the old oil compartment there is no necessity to have a method for displacing air in the old oil compartment since there is little or no air in the old oil compartment 12.

FIG. 2 shows the plug of this invention. Plug 20 is adapted to fit the opening in bottom of the oil pan of motor vehicles where the oil removal plug now fits. Since most if not all oil removal plugs are threaded oil plug 20 is also threaded and adapted to fit the threads in the oil pan opening. FIG. 3 is a top view of the oil plug and shows that there is an opening 24 that passes through the oil plug 20. This opening 24 is attached to tube 26. At the end of tube 26 opposite where it attaches to the opening 24 a quick disconnect is attached to the tube 26. This quick disconnect is adapted to fit within the quick disconnect 18 on the old oil tube 16. Tube 26 can be attached to the plug with a quick disconnect 28 as shown in FIGS. 2 and 3 or by the threads, welding or any other method known in the art. Tube 16 can also attach to opening 24 via quick disconnect 28.

The method for changing oil is as follows. If one does not have this invention's oil plug 20 already placed in the oil pan than one changes the oil by methods in the previous art. When one has fully allowed the oil to run out of the oil pan then one replaces the oil pan plug with this invention's oil pan plug 20. One then connects the tube 26 to the side of the motor vehicle. When one wants to change the oil again attaches the old oil tube 16 to the tube 26 and allows the oil to run from the oil pan into the old oil compartment 12 of the old oil container 10. Then one takes the old oil filter from the automobile and places it in the old oil filter compartment 14 of the old oil container 10. Thus one has all the old oil and the old oil filter in a single container. To place the oil into the car one takes the container 30 shown in FIG. 4 that houses enough oil for the automobile and places the new oil tube 32 into the oil filter fill tube of the motor vehicle. Then one turns the valve 34 and allows the oil to flow into the automobile.

FIG. 5 shows a cutaway view of the oil and filter combination pack 40. Element 42 is the oil compartment that is a large compartment with an opening 44 in the bottom. The opening 44 has a quick connect valve 46 that turns off when not connected. The oil filter side 48 contains an oil filter 50 and in the bottom there are two openings with quick disconnectors 56 and 58. These disconnectors 56 and 58 are designed so when the filter is disconnected no oil will flow through the disconnectors 56 and 58. These quick disconnectors are attached to the return oil filter line 52 and the feed oil filter line 54 shown in FIG. 6 from the engine. The quick disconnector 44 in the oil compartment 42 is attached to the oil filler line 64.

Figure 6:
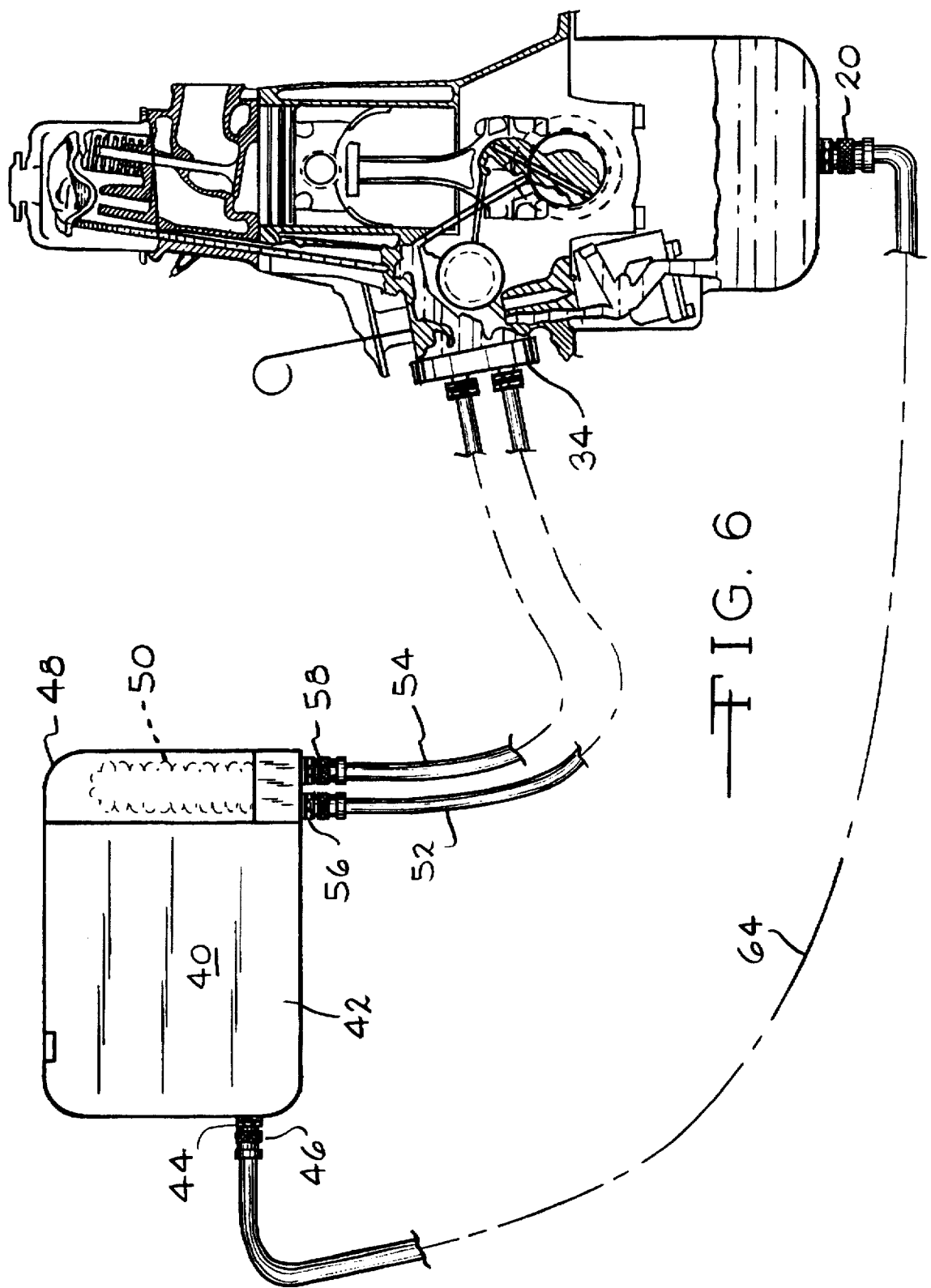
FIG. 6 shows the oil and filter combination pack attached to the engine. This figure is not to scale.

FIG. 6 shows the engine as it attaches to the oil pack not to scale. FIG. 6 shows the return oil filter line 56 and the feed oil filter line 58. Attached to the engine is also an adapter 34. Adapter 34 allows a normal engine to be hooked up to the oil filter combination pack 40. FIG. 7, 7a, and 7b shows the bottom, side, and perspective view of adapter 34. The bottom 35 of adapter 34 has the same configuration as the oil filter for the vehicle. The top 37 of adapter 34 has two openings 41 and 43 that attach to the return oil filter line 56 and the feed oil filter line 58. Also FIG. 6 shows the oil filler line 64 runs out of the bottom of the engine to the oil filter combination pack 40.

This embodiment uses the same plug 20 as the first embodiment. Attached the this plug 20 is the oil filler line 64. Oil filler line 64 attaches to plug 20 with a quick connect.

Upon installation of the oil filter the oil compartment 42 collapses so that the oil filter combination pack can fit within a small area. In some trucks there will be sufficient room that it will not be necessary for the oil compartment 42 to collapse.

The changing of the oil with the oil filter combination pack 40 is as follows. First one lifts out the old combination filter pack 40 and disconnects the oil filter return line 56, the oil feed line 58, and filler line 64. The old combination pack 40 is placed on the ground and hooked to filler lines 64. The filler line 64 is connected to the oil compartment 42. The oil will then flow out of the engine and into the oil compartment 42. When all the oil is out of the motor the filler line 64 is disconnected from the old oil filter combination pack 40. Then one has the old filter and used oil together in the old oil filter combination pack to take to the recycling center. Then a new oil filter combination pack 40 is placed in the engine by attaching the oil filler line 64, the oil filter return line 56 and the oil filter feed line 58. In the new oil filter pack the oil compartment 42 is full with new oil. The individual allows the oil to drain out of the oil compartment 42 so all the new oil is within the system. Then one collapses the oil compartment and places it in position on the motor.

The oil filler line 64 on the oil pack end is designed such that no oil will flow out of it when it is disconnected from the oil filter pack combination 40.

Changes and modifications in the specificity described embodiments can be carried out without departing from the scope of the invention which is intended to limited only by the scope of the appending claims.

I claim:

1. A system for changing oil for a single vehicle with an oil pan with an opening comprising:
   a. a container with two compartments and one of said compartments is collapsible and is adapted to hold the oil from the single vehicle and said other compartment is of a size sufficient to hold the oil filter from that vehicle; and,
   b. a first tube with two ends, the first end is attached and opens into the compartment of the container for holding the oil; and,
   c. a first quick disconnect attached to the second end of the tube; and,
   d. a plug adapted to fit within the opening of the oil pan of the vehicle; and,
   e. an opening in the plug that passes through the plug; and,
   f. a second quick disconnect that is adapted to quick disconnect with the first quick disconnect attached to the opening in the plug; and,
   g. whereas to the change the oil from the vehicle the plug is placed in the opening of the oil pan of the vehicle and when it is time to change oil the first quick disconnect is quick connected to the second disconnect in the plug and the container is placed below the oil pan such that the oil from the vehicle will drain from the oil pan into the first compartment and when all the oil has drained from the oil pan into the first compartment then the second quick disconnect is quickly disconnected from the first quick disconnect and the oil filter from the vehicle is removed from the vehicle and placed in the second compartment and thus the used oil filter and the used oil is in a single container.

2. A system for changing oil as in claim 1 wherein:
   a. the container is made out of plastic.

3. A system for changing oil as in claim 1 further comprising:
   a. a second tube with two ends and the first end has a quick disconnect that is adapted to attach to the quick disconnect of the opening of the plug in the oil pan and the other end has a quick disconnect that is adapted to attach to the quick disconnect of the first tube, and,
   b. said second tube's first end is attaches to the quick disconnect of the opening in the plug and said second tube's second end is attached to the edge of the vehicle such that one could attach said first tube to said second tube without having to get under said vehicle.

4. A method for changing oil using the system of claim 1 comprising the steps of:
   a. attaching the tube from the container to the oil plug; and,
   b. allowing the oil to flow from the oil pan into the container; and,
   c. removing the old oil filter and placing it into the container; and,
   d. placing a new oil filter into said vehicle; and,
   e. pouring new oil into said vehicle.

* * * * *